May 28, 1963

E. H. BRIDGES 3,091,152

VISUAL INSTRUCTING DEVICE

Filed March 1, 1962

INVENTOR.
Elmer H. Bridges
BY
Roberts, Cushman & Grover
ATT'YS

United States Patent Office 3,091,152
Patented May 28, 1963

3,091,152
VISUAL INSTRUCTING DEVICE
Elmer H. Bridges, East Kingston, N.H.
Filed Mar. 1, 1962, Ser. No. 176,524
4 Claims. (Cl. 84—478)

This invention relates to devices for use in teaching and/or demonstrating the use of the pedal keyboard of an organ.

The advent of the electric organ at a price within the range of the average family has resulted in wide-spread use and in the need for a teaching aid to assist novices in learning to play simple melodies as early as possible for their own amusement, thereby to stimulate continued use and enthusiasm which may ultimately result in skill and perfection.

For most persons, the fingering of the finger keyboard can be acquired rapidly because the keys and fingers can be seen and the traverse of the eyes from the music piece to the finger board is rapid enough so that the player never completely loses sight of the music or his fingers on the finger keyboard. This is not so, however, with the pedals of the pedal keyboard which are situated beneath the finger keyboard in a position such that the player, when seated in a normal position at the console, can neither see the pedals or his feet, hence difficulty is experienced in learning to use the feet correctly. This is further aggravated by the fact that many persons find it difficult coordinating movements with both the hands and the feet at the same time. The principal objects of this invention are therefore to provide means to assist a novice in acquiring skill in the use of the pedals of the pedal keyboard; to provide a device of the foregoing kind which is visual in character and which may be seen without appreciable movement of the eyes from the music piece or the finger keyboard; to provide a device which does not require a specific knowledge of the character of the notes themselves but rather depends upon the position of the pedals; to provide a device which will, by the distinctive lighting or coloring, facilitate distinguishing between white and black keys; to provide a device which is compact and of suitable appearance to complement the console of the organ; and to provide a device which is simple to install, requires little power, requires substantially no upkeep and can be manufactured at a cost low enough to be available to most persons.

The device, as herein illustrated, is a visual one comprised of an indicator adapted to be supported on the console of the organ above the finger keyboard and bears indicia which corresponds to the pedals of the pedal keyboard situated below the finger keyboard, and of means operable by each pedal of the pedal keyboard to effect illumination of indicia on the indicator corresponding in position to the pedals depressed. The indicator may comprise a translucent panel bearing the indicia comprising a staff, cleft, ledger lines and the letters of the notes corresponding to the pedals of the pedal keyboard, or the indicia may comprise a pictorial simulation of the pedals of the pedal keyboard.

The invention will now be described in greater detail with reference to the accompanying drawings wherein.

Figure 1:
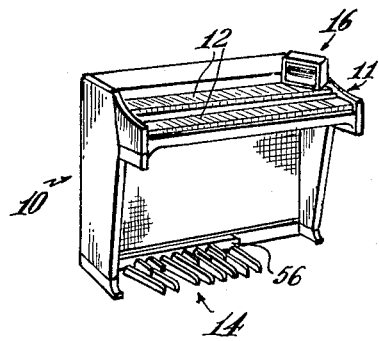
FIG. 1 is a perspective view of an organ showing the console, finger keyboard, pedal keyboard and the device which forms the subject matter of this invention, supported adjacent the right hand end of the finger keyboard.

Referring to FIG. 1, there is illustrated the console 10 of an electric organ which is provided with two finger keyboards 12 supported in the customary manner as by a forwardly projecting ledge means 11 and a pedal keyboard 14.

Referring to the drawings, the device comprises an indicator 16 (FIG. 2), which may be placed at one end of the finger keyboard and bears on its front side indicia representing the staff, cleft, ledger lines and the letters of the notes. Specifically, the device comprises a relatively small box 18 having a front wall 20 covered with a sheet 21 of translucent material on which there is printed, marked, inscribed, applied or the like indicia representing a staff 22, cleft 24, ledger lines 26 and lettering 28, corresponding to the notes of the scale operable by the pedals 14. The wall 20 contains holes 23 behind the translucent sheet 21, FIG. 3, which register with the notes on the sheet 21. A lamp 30 is disposed in each hole and when energized will illuminate the note on the sheet 21 with which it is in registration. A transparent colored disc 34 may be placed in each of the holes corresponding to the black keys between the lamp and the sheet 21 or on the outer surface of the sheet 21 or a colored lamp may be employed instead to provide a distinctive contrast between the white and black keys. Optionally, lamps of different intensity may be provided for affording the contrast between the white and black keys. The lamps are connected by suitable wiring 36, as shown in FIG. 3, to a conventional terminal element 38 by way of individual microswitches S, one of which is provided for each pedal. The switches S are secured to the base of the console adjacent the pedals as will be described hereinafter in a position such that each switch is closed by depression on the treadle and opened by elevation thereof. Thus, each time a pedal is depressed the note on the indicator corresponding to that pedal will be illuminated, indicating to the player the pedal upon which he has his foot at any given time.

Figures 4, 7:
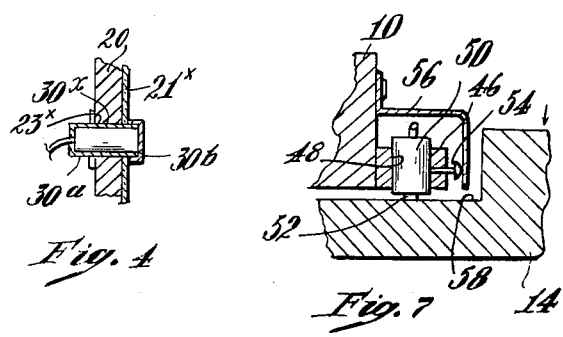
FIG. 4 is a fragmentary section corresponding to FIG. 3 showing a different kind of lamp for illuminating the indicia on the front of the indicator.
FIG. 7 is a vertical section taken at right angles to the mounting block on the line 7—7 of FIG. 6.

Instead of providing the holes 23 for the lamps 30 the wall 20 may be provided with holes 23$^x$ for receiving the lamp units 30$^x$, FIG. 4, the forward ends of which project from the front wall about one-quarter of an inch. Each unit has an opaque side wall 30$^a$ and a transparent front wall 30$^b$. The transparent front wall projects through the sheet 21$^x$ bearing the indicia. The lamps 30$^x$ are connected in circuit in just the same way as the lamp 30.

Figure 2:
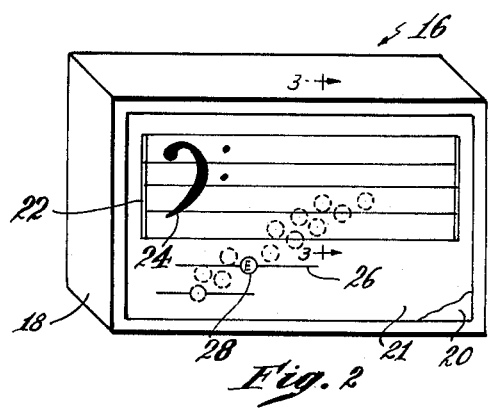
FIG. 2 is a perspective view to very much larger scale of the device, showing one form of indicator.
Figure 5:
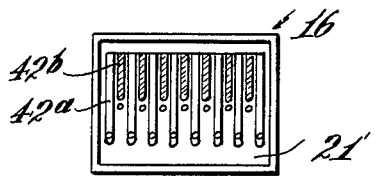
FIG. 5 is an alternative form of indicator to much smaller scale.
Figure 3:
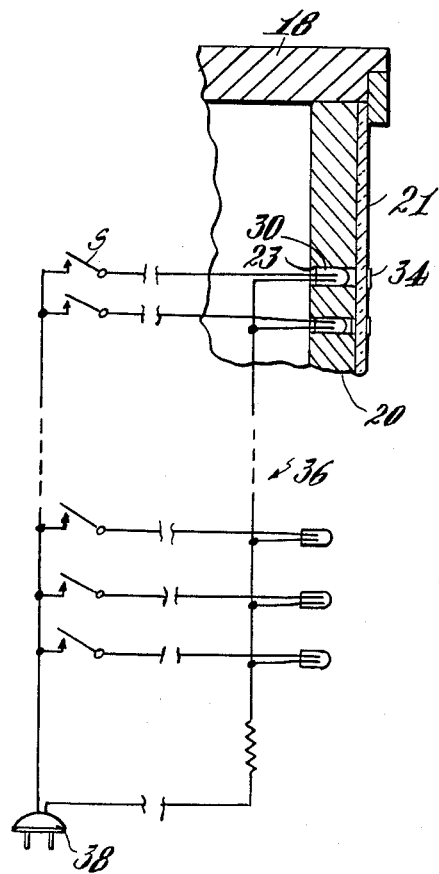
FIG. 3 is a fragmentary section, to larger scale, taken on the line 3—3 of FIG. 2, showing the means for illuminating the indicia and schematically the wiring diagram.

A pictorial simulation of the pedals, FIG. 5, may be preferred instead of the staff and cleft as shown in FIG. 2. The simulated pedals 42$^a$, 42$^b$ are marked on the translucent sheet 21' and constitute a duplication of the pedal keyboard 14. The indicia 42$^a$ represents the white keys and the indicia 42$^b$ the black keys. The lamps 30 or 30$^x$ as the case may be are located in the box within the holes 23, 23$^x$ in the panel 20 so as to illuminate the respective indicia. Preferably the lamps are placed close to the ends of the respective indicia and, as previously related, may provide contrasting intensity of illumination of contrasting color.

Figure 6:
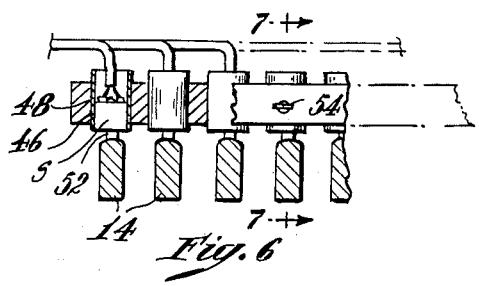
FIG. 6 is a vertical section taken lengthwise of a mounting block for the switches.

The switches S are mounted adjacent the upper sides of the pedals 14 in a rigid bar 46, FIGS. 6 and 7, the latter being fastened to the base of the console. The bar 46 contains spaced vertical holes 48, one above each pedal and a tube 50 is disposed in each hole. A microswitch S is fixed in the lower end of each tube with its actuating nib 52 projecting downwardly therefrom into engagement with the subjacent pedal. In adjusting the apparatus for use, the tubes are pushed downwardly in the holes in the bar 46 far enough to depress the actuating nibs 52 and hence to open their contacts. Set screws 54 are provided for fixing the tubes in the proper position with reference to the tops of the pedals which are not necessarily all at the same level. The conducting wires from the several switches extend upwardly from the tops of the tubes and are collected to form a single cable in suitable fashion. A cover 56 of anodized aluminum or other suitable material may be fastened to the base of the console over the switch bar 46 to conceal the switches and their wiring. The clearance spaces 58, FIG. 7, where the pedals protrude from the base of the console are large enough to accommodate the switch mounting means and so may be availed of to keep the attachment as inconspicuous as possible.

The box 18 is approximately six inches by three inches by two and one-half inches and may be made of wood, metal or plastic or a combination of these. The lamps are preferably of very small size and are frequently referred to as "grain of wheat" which take little power and are inexpensive enough to be replaced at a very low cost.

It is clear from the foregoing that the indicator which forms the subject matter of this invention is so designed as to take up the minimum amount of space and yet operates effectively to indicate to the player the position of his feet on the pedal keyboard and has the further advantages that it can be easily installed, can be accurately adjusted to the instrument to which it is to be applied in spite of minor variations in the level of the treadles, takes up very little room and consumes very little power and can be manufactured at a cost which is small with respect to the cost of the organ itself.

It should be understood that the present disclosure is for the purpose of illustration only and that this invention includes all modifications and equivalents which fall within the scope of the appended claims.

I claim:

1. Indicating apparatus for use in combination with an organ console having at the top a finger keyboard, a forwardly projecting ledge supporting the finger keyboard, and a pedal keyboard at the base beneath the ledge situated out of sight of a player seated in playing position, comprising a device located adjacent the finger keyboard and bearing indicia having the same relative position to each other as the pedals of the pedal keyboard, means for illuminating the indicia, and means located at the base of the console adjacent the pedal keyboard, said means being operative, by depression of the pedals, to effect illumination of the indicia on the said device above the said ledge, corresponding to the pedals depressed, so as to indicate to the player the position of the feet on the pedal keyboard below the ledge.

2. Apparatus according to claim 1, comprising means for illuminating the indicia representing white pedals distinctively of the indicia representing black pedals.

3. Apparatus according to claim 1, wherein the said means at the base of the console comprises a plurality of switches corresponding in number to the pedals, means supporting the switches above the pedals comprising a supporting bar fixed to the base of the console adjacent the upper side of the pedals, said bar containing a plurality of holes, one above each pedal, for holding a switch for adjustment heightwise with respect to the pedal adjacent thereto, and means for fixing each switch in the hole in a position to be held open by the undepressed pedal.

4. Apparatus according to claim 1, wherein the said means at the base of the console comprises a supporting bar fastened to the base of the console adjacent the upper side of the pedals, said bar containing a hole above each pedal, a tube slidably disposed in each hole, a switch having an actuating nib fixed in the lower end of each tube in a position such that said nib projects downwardly toward the pedal, a screw for holding each tube in a heightwise position such that the pedal, by engagement with the nib, holds the switch open, and a cover fixed to the base of the console over the bar and switches concealing the same.

References Cited in the file of this patent

UNITED STATES PATENTS

| | | |
|---|---|---|
| 1,268,376 | Miessner et al. | June 4, 1918 |
| 1,324,276 | Schantz | Dec. 9, 1919 |
| 1,889,418 | Pierce | Nov. 29, 1932 |
| 2,499,244 | Hammond et al. | Feb. 28, 1950 |
| 2,547,535 | Pierce et al. | Apr. 3, 1951 |
| 2,625,070 | French | Jan. 13, 1953 |

FOREIGN PATENTS

| | | |
|---|---|---|
| 747,088 | Germany | Sept. 8, 1944 |